(Model.)

I. GÉRARD.
CAR BRAKE AND STARTER.

No. 263,163. Patented Aug. 22, 1882.

WITNESSES:
J. D. Garfield
C. Sedgwick

INVENTOR:
I. Gérard
BY Munn & Co.
ATTORNEYS.

UNITED STATES PATENT OFFICE.

ISIDORE GÉRARD, OF NEWTON, KANSAS.

CAR BRAKE AND STARTER.

SPECIFICATION forming part of Letters Patent No. 263,163, dated August 22, 1882.

Application filed May 8, 1882. (Model.)

*To all whom it may concern:*

Be it known that I, ISIDORE GÉRARD, of Newton, in the county of Harvey and State of Kansas, have invented a new and useful Improvement in Mechanism for Stopping and Starting Cars, of which the following is a full, clear, and exact description.

This invention relates to certain improvements in devices for assisting the horses to start street-cars; and the invention consists in the special construction, arrangement, and combination of parts hereinafter set forth and claimed.

Reference is to be had to the accompanying drawings, forming a part of this specification, in which similar letters of reference indicate corresponding parts in all the figures.

Figure 1:
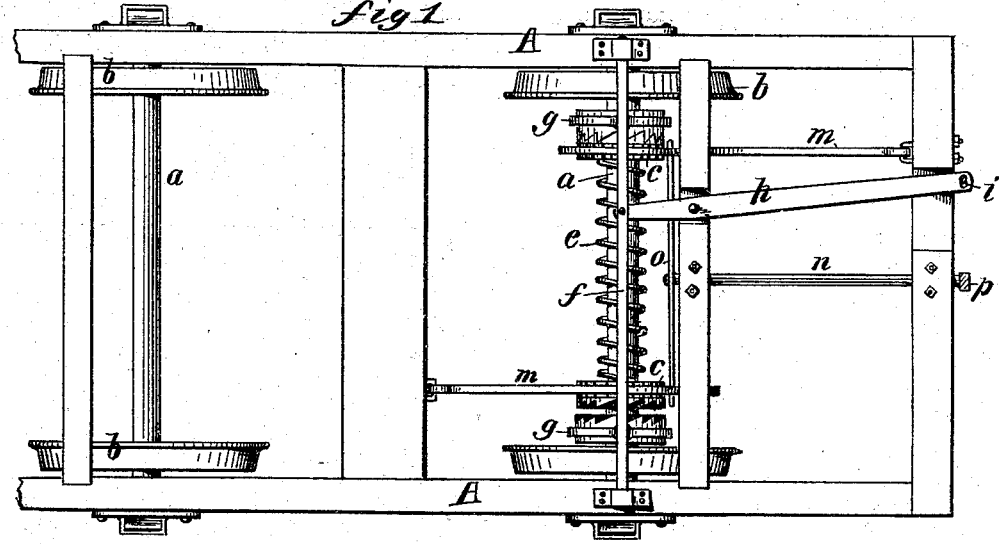
Figure 2:
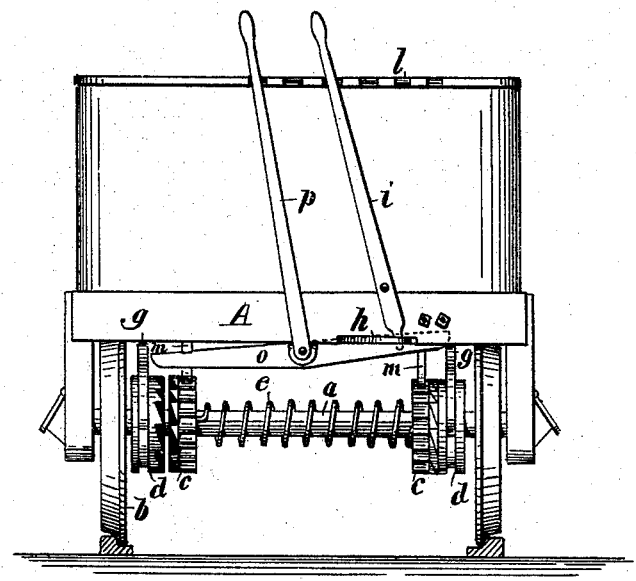
Figure 3:
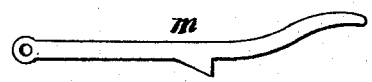

Figure 1 is a plan view of the running-gear of a car with my improved mechanism applied thereto, and Fig. 2 is an end view of the same. Fig. 3 is a side view of one of the pawls.

A represents the frame-work of a car, a a the axles, and b b the wheels.

In cases where the car can be turned end for end at the end of the route the mechanism need be applied to one axle only; but in other cases it will be applied to both axles.

c c are ratchet-wheels loose upon the axle a, placed one in reverse of the other, and formed on their outer sides with teeth or lugs for engagement with sliding clutches d d, that are also upon the axles and connected thereto by pins and grooves.

e is a spiral spring of suitable strength, placed around the axle and connected at its ends to the ratchet-wheels c c.

f is a cross-bar fitted to slide on the frame A, and carrying forks g g, that engage the clutches d. This bar f is fitted for movement by a lever, h, and handle i, the handle being pivoted at the front of the car in a convenient position for movement by the driver.

l is a notched rack on the dash-board for retaining the handle i in position as moved.

m m are pawls hung on frame A, and projecting over the ratchet-wheels c c so as to engage therewith to prevent their rotation. n is a rock-shaft, carrying at its rear end a cross-piece, o, that projects beneath the pawls m, and fitted at its forward end with a handle, p, also placed at the front of the car for operation by the driver.

The operation is as follows: When the car is moving the handle i is placed in the notch of the bar l, for holding the clutches d out of contact with the ratchet-wheels. When the car is to be stopped the handle p is first moved to allow one of the pawls m to engage its ratchet-wheel, according to the direction in which the car may be moving, and the handle i will be moved to engage the clutch with the other ratchet-wheel, so that the ratchet-wheel last named is thus made to turn with the axle, and the spring e being held at the other end by the stationary ratchet-wheel, the spring is wound, thus resisting the momentum of the car and assisting its stoppage. When the car is stopped, handle p is moved to the middle position, so that the other pawl m may drop and prevent recoil of the spring. When the car is to be started the handle i is first moved to release the clutch from the ratchet-wheel previously engaged and to engage the other ratchet-wheel with its clutch, and the handle p also moved to raise the pawl from that ratchet-wheel, and the spring, being thus released, exerts its force upon the axle in a direction to start the car forward.

Having thus described my invention, I claim as new and desire to secure by Letters Patent—

In mechanism for starting and stopping cars, the handle p, rock-shaft n, and cross-piece o, in combination with the pawls m m and reverse ratchet-wheels c c, substantially as shown and described.

ISIDORE GÉRARD.

Witnesses:
FELIX P. SWEMBERGH,
FRANK ZURCHER.